US008708239B2

(12) United States Patent
Selg et al.

(10) Patent No.: US 8,708,239 B2
(45) Date of Patent: Apr. 29, 2014

(54) STORED-VALUE CARD WITH AUDIO CAPABILITIES

(75) Inventors: Dawn M. Selg, Minneapolis, MN (US);
Ted C. Halbur, Lino Lakes, MN (US);
Dave B. Smith, St. Paul, MN (US);
Timothy P. Clegg, Manhatten Beach, CA (US)

(73) Assignee: Target Brands, Inc., Minneapolis, MN (US)

( * ) Notice: Subject to any disclaimer, the term of this patent is extended or adjusted under 35 U.S.C. 154(b) by 76 days.

(21) Appl. No.: 13/400,455

(22) Filed: Feb. 20, 2012

(65) Prior Publication Data

US 2012/0145800 A1 Jun. 14, 2012

Related U.S. Application Data

(63) Continuation of application No. 12/112,121, filed on Apr. 30, 2008, now Pat. No. 8,118,230, which is a continuation of application No. 11/037,385, filed on Jan. 18, 2005, now Pat. No. 7,376,564.

(51) Int. Cl.
*G06K 7/00* (2006.01)

(52) U.S. Cl.
USPC .......................................... 235/487; 235/492

(58) Field of Classification Search
USPC ................................................ 235/487, 492
See application file for complete search history.

(56) References Cited

U.S. PATENT DOCUMENTS

| 3,351,268 | A | 11/1967 | Schroeder |
| 4,299,041 | A | 11/1981 | Wilson |
| 4,791,741 | A | 12/1988 | Kondo |
| D305,887 | S | 2/1990 | Nishimura |
| 5,063,698 | A | 11/1991 | Johnson et al. |
| 5,275,285 | A | 1/1994 | Clegg |
| 5,359,374 | A | 10/1994 | Schwartz |
| 5,387,108 | A | 2/1995 | Crowell |
| 5,539,819 | A | 7/1996 | Sonoyama et al. |
| 5,577,918 | A | 11/1996 | Crowell |

(Continued)

FOREIGN PATENT DOCUMENTS

GB 2277482 A 11/1994

OTHER PUBLICATIONS

"Credit Union tech-talk," www.cunews.com/newsletters/20004419. htm, Apr. 19, 2004 (8 pages).

(Continued)

*Primary Examiner* — Daniel Hess
(74) *Attorney, Agent, or Firm* — Griffiths & Seaton PLLC; JoAnn M. Seaton

(57) ABSTRACT

A stored-value card includes a housing, an audio circuit storing an audio file, and a speaker coupled to the audio circuit. The housing includes a first panel, a second panel spaced from and positioned opposite the first panel, and a side wall extending between the first panel and the second panel. The side wall extends substantially perpendicular to each of the first panel and the second panel such that an open cavity is formed between the first panel and the second panel. The housing further includes an account identifier signifying a financial account or record linked to the stored-value card. The audio circuit and the speaker are substantially enclosed within the open cavity of the housing. Stored-value card assemblies and methods of using a stored-value card are also disclosed.

22 Claims, 10 Drawing Sheets

(56) References Cited

U.S. PATENT DOCUMENTS

| | | | |
|---|---|---|---|
| 5,641,164 A | 6/1997 | Doederlein et al. | |
| 5,762,376 A * | 6/1998 | Taskett | 283/57 |
| 5,774,861 A | 6/1998 | Spector | |
| 5,778,574 A | 7/1998 | Reuben | |
| 6,019,284 A * | 2/2000 | Freeman et al. | 235/380 |
| 6,028,752 A | 2/2000 | Chomette et al. | |
| 6,068,183 A | 5/2000 | Freeman et al. | |
| D429,733 S | 8/2000 | Jones et al. | |
| D436,991 S | 1/2001 | Morgante | |
| 6,356,626 B1 | 3/2002 | Ohara et al. | |
| 6,402,039 B1 | 6/2002 | Freeman et al. | |
| 6,607,136 B1 | 8/2003 | Atsmon et al. | |
| 6,666,378 B2 | 12/2003 | Davila et al. | |
| 6,671,358 B1 | 12/2003 | Seidman et al. | |
| 6,718,013 B2 | 4/2004 | Turner et al. | |
| 6,902,116 B2 | 6/2005 | Finkelstein | |
| 7,290,713 B2 | 11/2007 | Dean et al. | |
| 7,290,714 B2 | 11/2007 | Halbur et al. | |
| 7,434,735 B2 | 10/2008 | Dean et al. | |
| 7,770,802 B2 | 8/2010 | Dean et al. | |
| 8,226,001 B1 | 7/2012 | Foo et al. | |
| 2002/0017759 A1 | 2/2002 | McClung, III et al. | |
| 2002/0066789 A1 | 6/2002 | Yen | |
| 2002/0143697 A1 | 10/2002 | Gotfried | |
| 2002/0169608 A1 | 11/2002 | Tamir et al. | |
| 2003/0022586 A1 | 1/2003 | Beged-Dov | |
| 2003/0132300 A1 | 7/2003 | Dilday et al. | |
| 2003/0155425 A1 | 8/2003 | Lynch | |
| 2003/0192209 A1 | 10/2003 | Yeh | |
| 2004/0028235 A1 | 2/2004 | Pan | |
| 2004/0032732 A1 | 2/2004 | Rubin | |
| 2004/0055188 A1 | 3/2004 | Dolan-King | |
| 2004/0238625 A1 | 12/2004 | Walker et al. | |
| 2005/0052882 A1 | 3/2005 | Lath | |
| 2005/0090181 A1 | 4/2005 | Helou | |
| 2005/0236490 A1 | 10/2005 | Fortune et al. | |
| 2005/0246928 A1 | 11/2005 | Lee | |
| 2007/0215694 A1 | 9/2007 | Clegg | |
| 2009/0159673 A1 | 6/2009 | Mullen et al. | |
| 2009/0184170 A1 | 7/2009 | Clegg et al. | |

OTHER PUBLICATIONS

Kathleen M. Joyce, "Live from the Motivation Show 2003: AEIS Launches Two Recognition Programs," http://promomagazine.com/marketing_live_motivation_show_2/, Sep. 18, 2003 (2 pages).

Depiction of American Express card holder and prepaid card reported to have been publicly offered for sale in 2003.

Depiction of Bob's Stores card holder and prepaid card reported to have been publicly offered for sale in 2002.

Depiction of Yankee Candle card holder and prepaid card reported to have been publicly offered for sale in 2002.

U.S. Appl. No. 12/843,744, filed Jul. 26, 2010 (32 pages).

U.S. Appl. No. 11/926,236, filed Oct. 29, 2007 (27 pages).

* cited by examiner

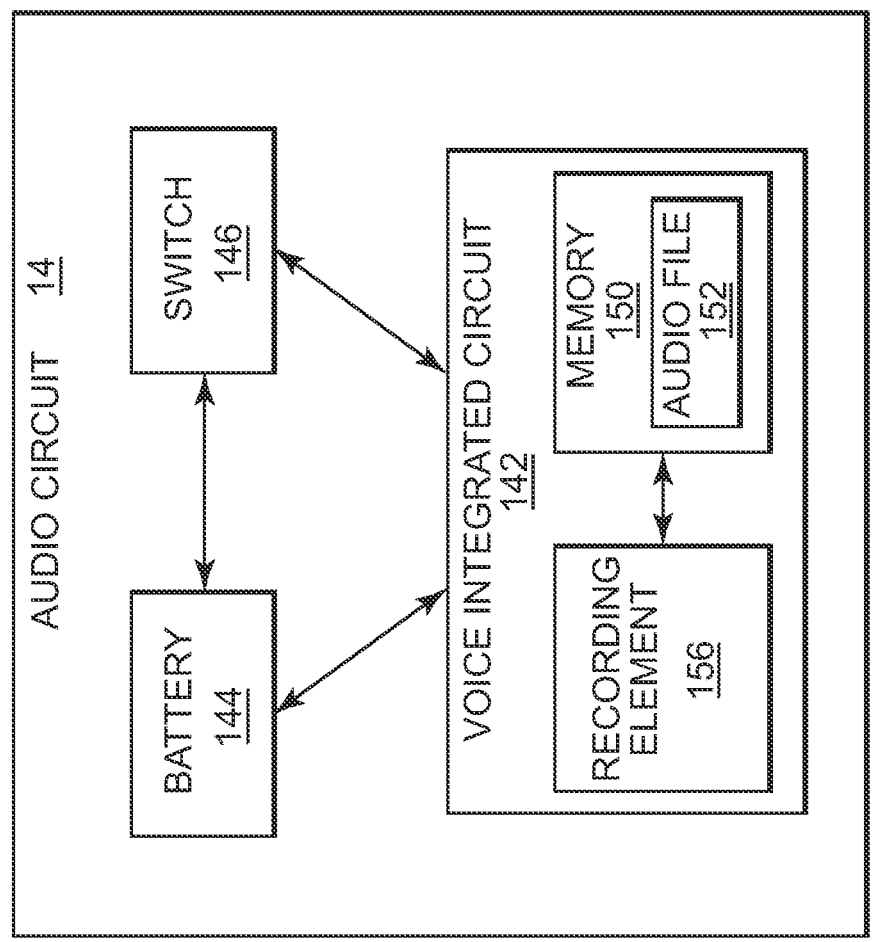

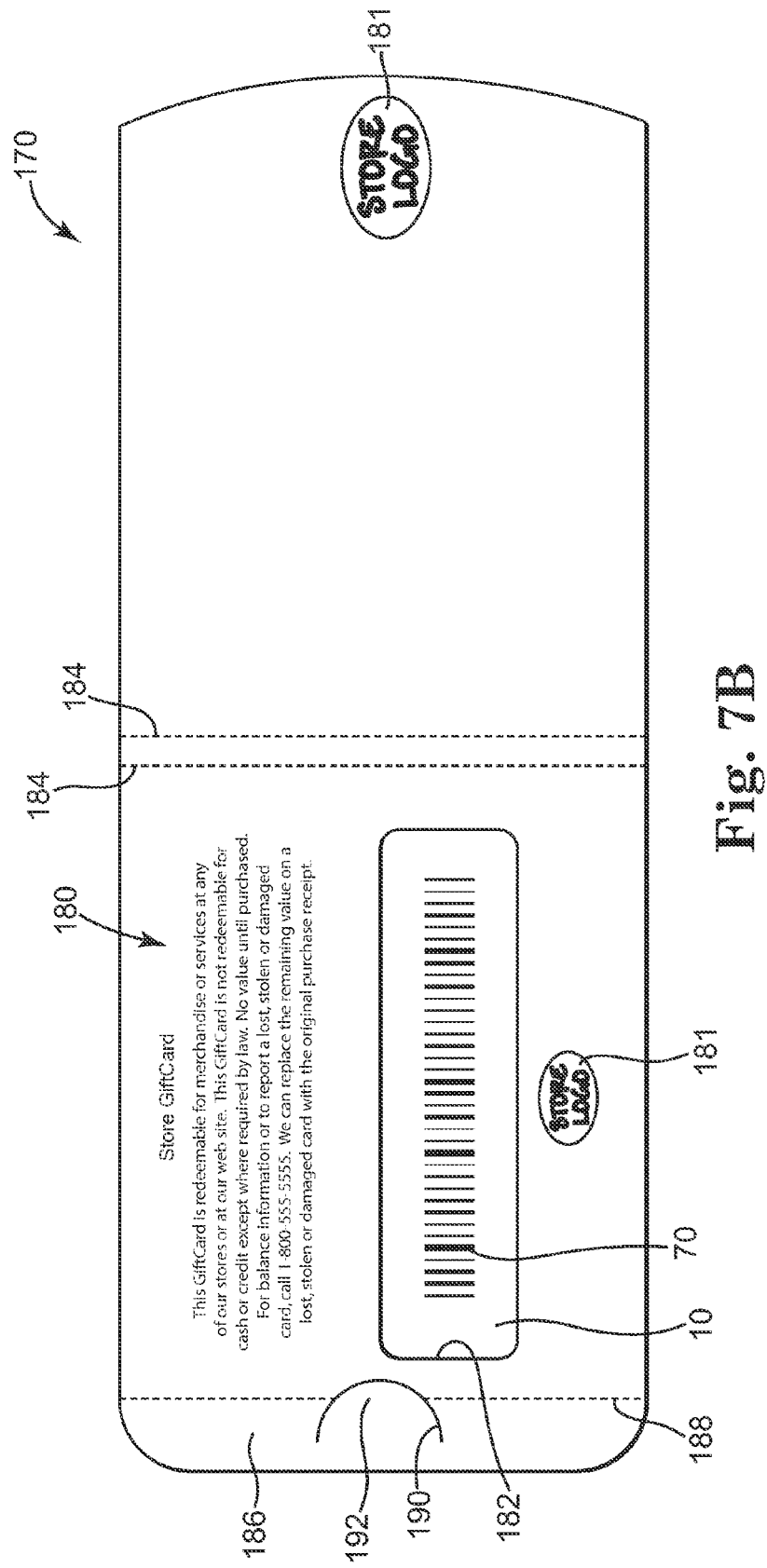

STORED-VALUE CARD WITH AUDIO CAPABILITIES

CROSS-REFERENCE TO RELATED APPLICATIONS

This application is a continuation of and claims priority under 35 U.S.C. §120 to U.S. patent application Ser. No. 12/112,121, filed Apr. 30, 2008, now U.S. Pat. No. 8,118,230, issued Feb. 21, 2012, which is a continuation of and claims priority to U.S. patent application Ser. No. 11/037,385, filed Jan. 18, 2005, now U.S. Pat. No. 7,376,564, issued May 20, 2008, both of which are incorporated herein by reference.

BACKGROUND OF THE INVENTION

Stored-value cards and other financial transactions cards come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a stored-value card including a housing, an audio circuit storing an audio file, and a speaker coupled to the audio circuit. The housing includes a first panel, a second panel spaced from and positioned opposite the first panel, and a side wall extending between the first panel and the second panel. The side wall extends substantially perpendicular to each of the first panel and the second panel such that an open cavity is formed between the first panel and the second panel. The housing further includes an account identifier signifying a financial account or record linked to the stored-value card. The audio circuit and the speaker are substantially enclosed within the open cavity of the housing. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 5A is a block diagram of one embodiment of the audio circuit of FIG. 5.

FIG. 7B is a back view of the unfolded carrier of FIG. 7A.

DETAILED DESCRIPTION

A gift card or other stored-value card is adapted for making purchases of goods and/or services from e.g. a retail store or website. According to one embodiment, an original consumer buys the stored-value card to give a recipient who in turn is able to use the stored-value card at a retail store or setting to pay for goods and/or services. The stored-value card, according to embodiments of the present invention, provides the consumer and recipient with extra amusement in addition to the ability to pay for goods and/or services with the stored-value card. In particular, the stored-value card presents the original consumer and the recipient the ability to hear an audio file related to the stored-value card. In one embodiment, the collective audio and visual presentation of the stored-value card promotes the sale and/or loading of the stored-value card by potential consumers and/or bearers of the stored-value card.

In some embodiments, the audio file of the stored-value card is related to a particular occasion, such as a wedding, new baby, graduation, holiday, season, etc. The audio file may also relate to printed indicia on the stored-value card for unifying the overall presentation of the audio file and the stored-value card to the customer and/or recipient. For example, in the case of a new baby, the new parents receive a stored-value card including indicia indicating the arrival of the newborn and an audio file of a baby giggling. Accordingly, the new parents can enjoy the amusement of the audio file, and can also use the stored-value card to shop for items to provide for the newborn.

Figure 1:
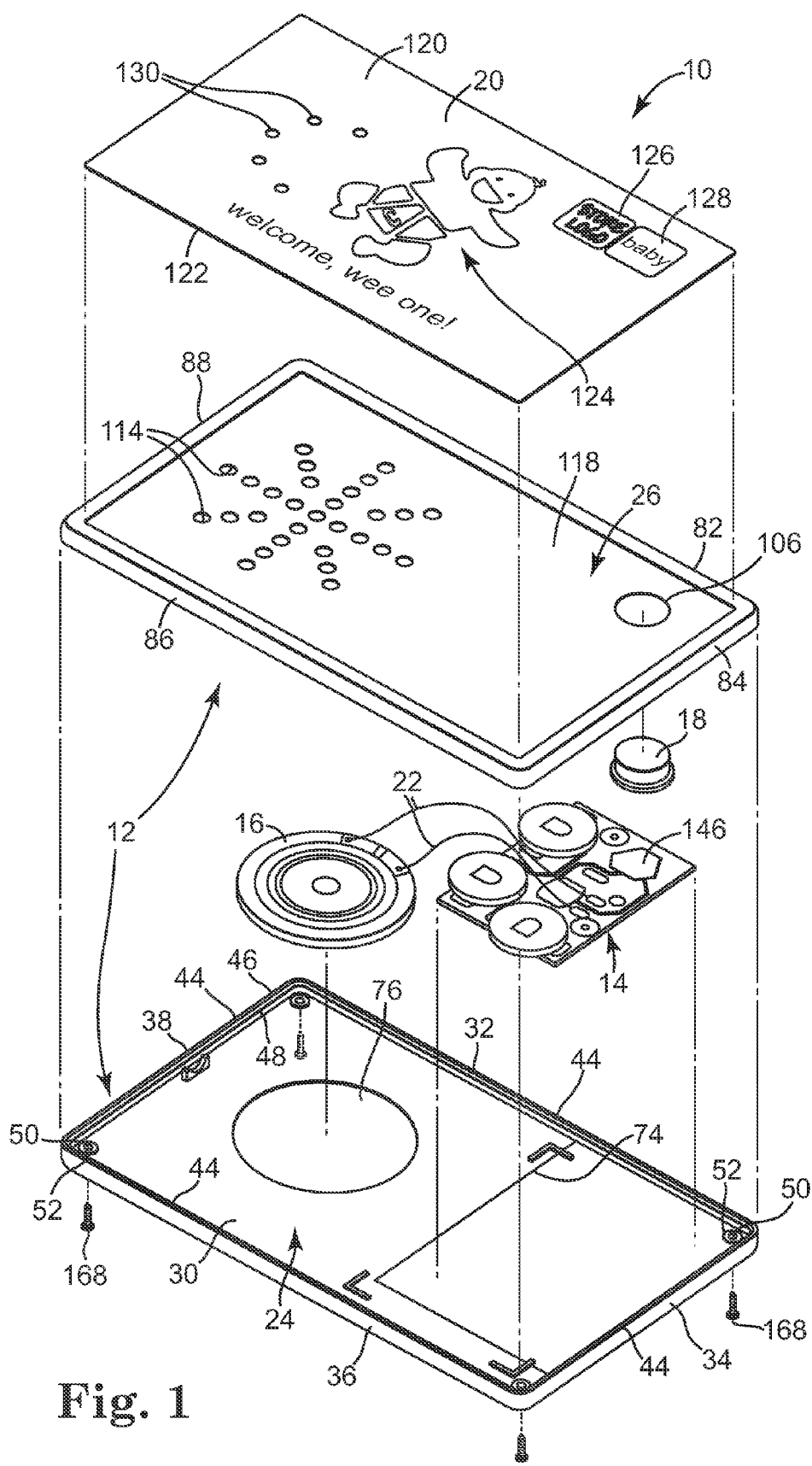
FIG. 1 is an exploded, top perspective view of one embodiment of a stored-value card, according to the present invention.

Turning to the figures, FIG. 1 illustrates an exploded, top perspective view of one embodiment of a stored-value card according to the present invention generally at 10. Stored-value card 10 includes a housing 12, an audio circuit 14, a speaker 16, a button 18, and a face panel 20. Audio circuit 14 is coupled to speaker 16 via connector wires 22. Audio circuit 14, speakers 16, and connector wires 22 are enclosed within housing 12. Button 18 is at least partially housed within housing 12 and is configured to interact with audio circuit 14. In particular, upon depression of button 18 by a user, audio circuit 14 is activated to play an audio file stored to audio circuit 14. Face panel 20 is optionally coupled to housing 12 to provide stored-value card 10 with indicia relating to one or more of an occasion, season, store identifier, brand identifier, media format identifiers (e.g. characters, logos, scenes, or other illustrations relating to at least one of a movie, television show, book, video game, etc.), character, etc.

Figure 2A:
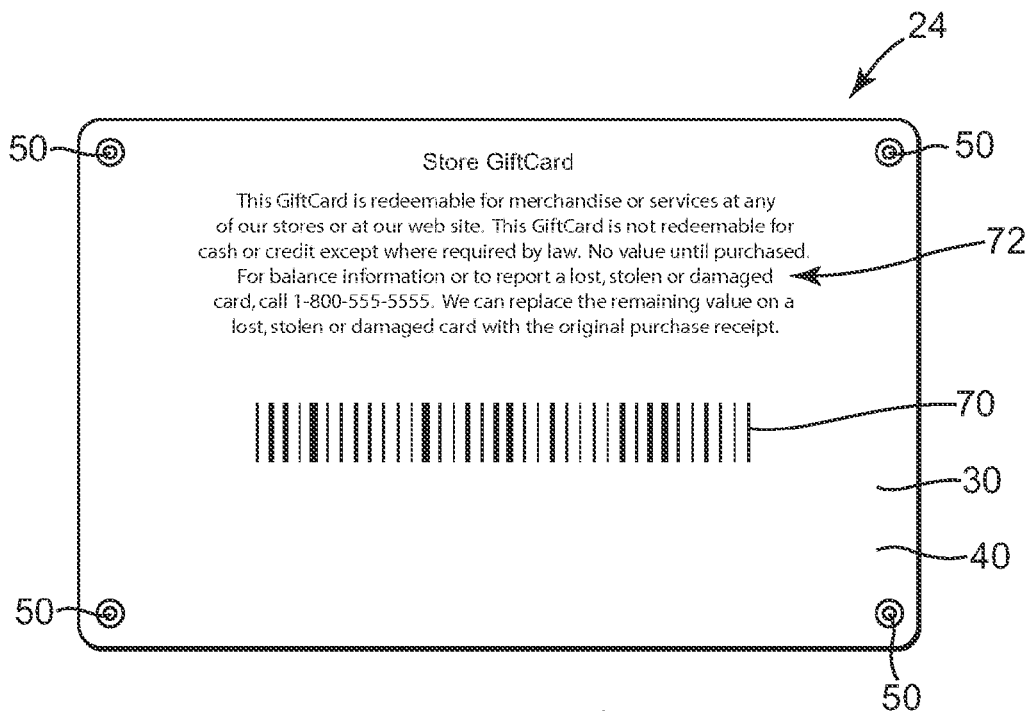
FIG. 2A is a bottom view of one embodiment of a base the stored-value card of FIG. 1, according to the present invention.
Figure 2B:
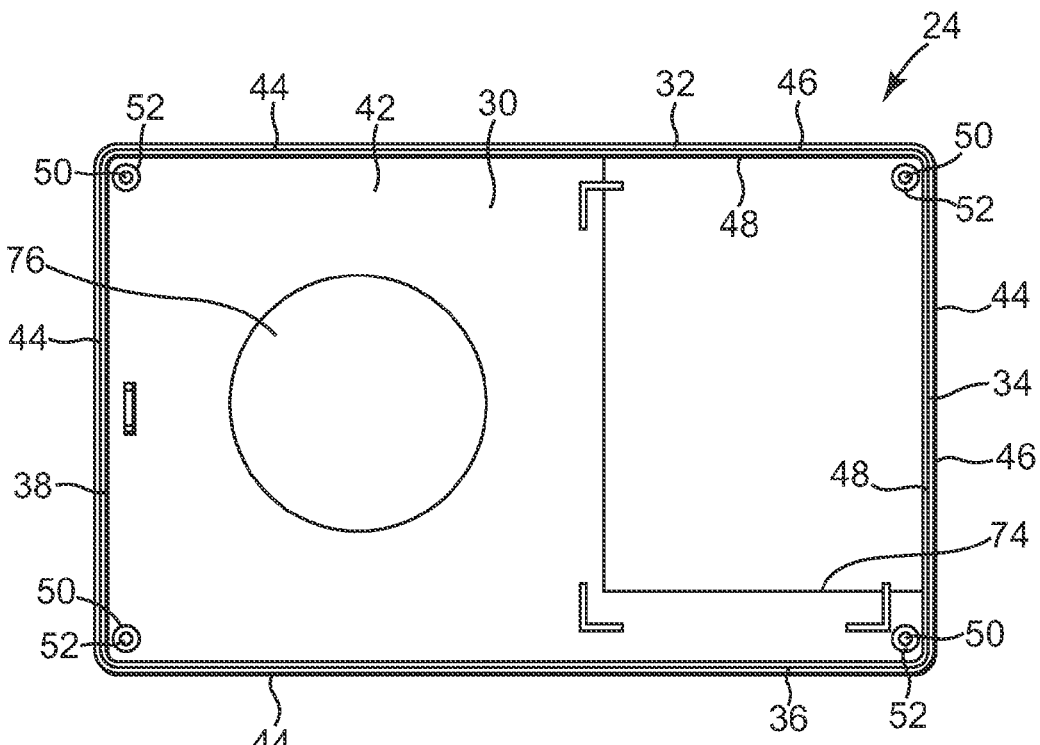
FIG. 2B is a top view of one embodiment of the base of FIG. 2A.

Housing 12 includes a first housing member 24 and a second housing member 26. In one embodiment, first housing member 24 is a base, and second housing member 26 is a cover. One embodiment of base 24 is illustrated in FIGS. 2A and 2B. Base 24 generally includes a primary panel 30 and side walls 32, 34, 36, and 38. Primary panel 30 is generally planar and defines an outside surface 40 and an inside surface 42 opposite outside surface 40. In one embodiment, primary panel 30 is generally rectangular and sized similar to an identification card, a credit card, or other card sized to fit in a wallet of a user. In other embodiments, primary panel 30 is otherwise shaped as a square, circle, oval, star, or any other suitable shape.

Side walls 32, 34, 36, and 38 each extend from inside surface 42 away from outside surface 40 and collectively extend generally about the entire perimeter of primary panel 30. In one embodiment, each side wall 32, 34, 36, and 38 extends with a generally perpendicular orientation relative to primary panel 30. In particular, first side wall 32 extends generally parallel to and is positioned opposite third side wall 36. Second side wall 34 and fourth side wall 38 each extend between first side wall 32 and third side wall 36 opposite and generally parallel to one another.

Each side wall 32, 34, 36, and 38 extends from primary panel 30 to collectively define an inside edge 44 opposite primary panel 30. In one example, inside edge 44 is formed as a stepped edge including a first portion 46 and a second portion 48. First portion 46 extends from primary panel 30 a further distance than second portion 48 extends from primary panel 30, as illustrated with additional reference to FIG. 1. In one example, first portion 46 extends generally about the perimeter of second portion 48. In this respect, inside edge 44 is formed as a stepped edge with the lower, second portion 48 being positioned just inside higher, first portion 46. In one embodiment, at least first portion 46 forms curved or chamfered corners at the intersection of each side wall 32, 34, 36, and 38 with another of side walls 32, 34, 36, and 38.

A plurality of apertures 50 extend through primary panel 30. More particularly, each aperture 50 extends from outside surface 40 through inside surface 42. In one embodiment, an aperture 50 is positioned near the intersection of each side wall 32, 34, 36, and 38 with another one of side walls 32, 34, 36, and 38. In one embodiment, apertures 50 are sized to at least partially receive a connection device, such as a screw or other device for coupling base 24 with cover 26. In one example, each aperture 50 allows the head of the screw or other attachment device to be recessed and, accordingly, includes a slightly larger section nearer outside surface 40 than near inside surface 42. In one embodiment, a cylindrical protrusion 52 extends from inside surface 42 around each aperture 50.

Outside surface 40 includes an account identifier 70 such as a barcode, magnetic strip, a smart chip or other electronic device, a radio frequency identification device, or other suitable identifier readily readable by a point-of-sale terminal or other account access station or kiosk. In one embodiment, account identifier 70 is printed on outside surface 40 of base 24. Account identifier 70 indicates a financial account or record to which stored-value card 10 is linked. The account or record of the monetary balance on stored-value card 10 optionally is maintained on a database, other electronic or manual record-keeping system, or, in the case of "smart" cards for example, on a chip or other electronics or devices on stored-value card 10 itself. Accordingly, by scanning account identifier 70, a financial account or record linked to stored-value card 10 is identified and can subsequently be activated, have amounts debited therefrom, and/or have amounts added thereto. With the above in mind, account identifier 70 is one example of means for linking stored-value card 10 with a financial account or record, and scanning of account identifier 70 is one example of means for activating or loading value on stored-value card 10.

In one embodiment, redemption indicia 72 are included on outside surface 40. Redemption indicia 72 indicate that stored-value card 10 is redeemable for the purchase of goods and/or services and that, upon use, a value of the purchased goods and/or services will be deducted from the financial account or record linked to stored-value card 10. In one embodiment, redemption indicia 72 include phrases such as "<NAME OF STORE> GiftCard" and "This GiftCard is redeemable for merchandise or services at any of our stores or at our web site," and/or provides help or phone line information in case of a lost, stolen, or damaged stored-value card, etc. In one embodiment, other indicia are also included on outside surface 40.

In one embodiment, inside surface 42 defines an audio circuit indentation 74 and a speaker indentation 76. Each indentation 74 and 76 is generally positioned to correspond with the future positioning of audio circuit 14 and speaker 16 within housing 12, respectively. Each indentation 74 and 76 forms an area where primary panel 30 has a slightly lesser thickness than other areas of primary panel 30. In this respect, audio circuit indentation 74 and speaker indentation 76 provide additional clearance for audio circuit 14 and speaker 16 to fit between base 24 and cover 26. With this in mind, in one example, audio circuit indentation 74 and speaker indentation 76 are generally shaped similarly to audio circuit 14 and speaker 16, respectively.

Figure 3A:
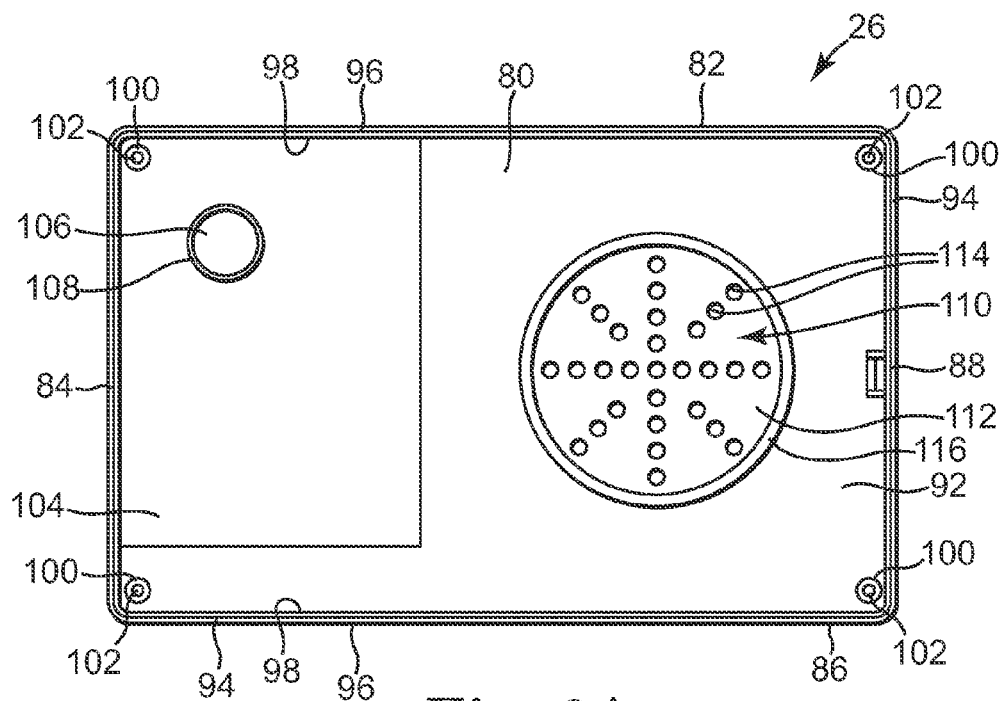
FIG. 3A is a bottom view of one embodiment of a cover of the stored-value card of FIG. 1, according to the present invention.
Figure 3B:
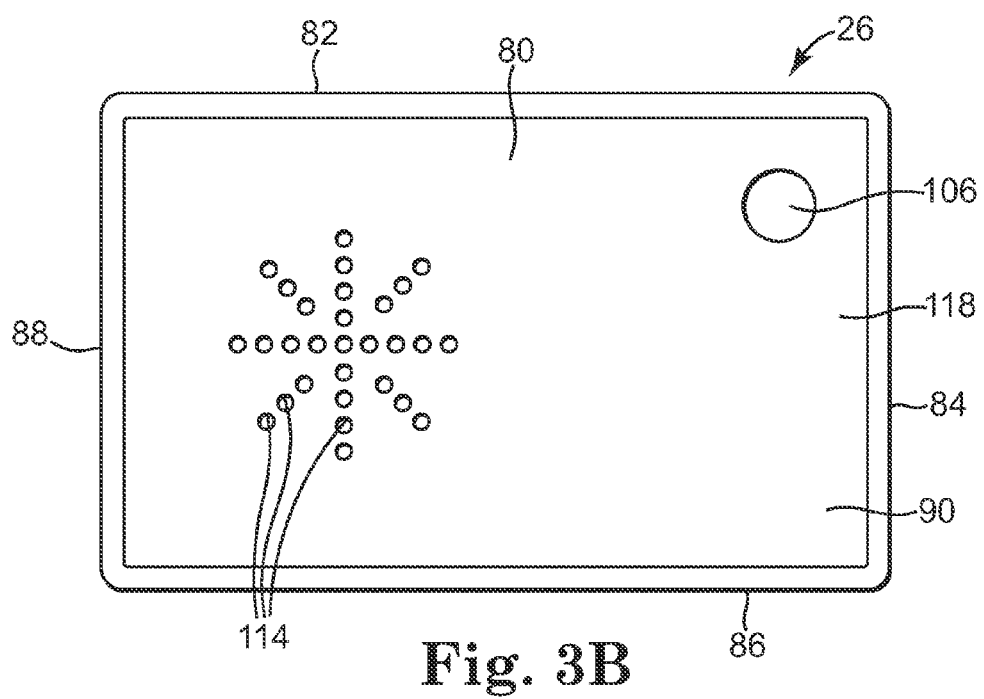
FIG. 3B is a top view of one embodiment of the cover of FIG. 3A.

One embodiment of cover 26 is illustrated in FIGS. 3A and 3B. Cover 26 generally includes a primary panel 80 and side walls 82, 84, 86, and 88. Primary panel 80 is generally planar and defines an outside surface 90 and an inside surface 92 opposite outside surface 90. In one embodiment, primary panel 80 is generally sized similar to primary panel 30 of base 24. Side walls 82, 84, 86, and 88 each extend from inside surface 92 and collectively extend generally about the entire perimeter of primary panel 80. For example, each side wall 82, 84, 86, and 88 extends with a generally perpendicular orientation relative to primary panel 80. In particular, first side wall 82 is positioned opposite and generally parallel to third side wall 86. Second side wall 84 and fourth side wall 88 extend between first side wall 82 and third side wall 86 opposite and generally parallel to one another.

Each side wall 82, 84, 86, and 88 extends from primary panel 80 to collectively form an inside edge 94 opposite primary panel 80. In one embodiment, inside edge 94 is a stepped edge including a first portion 96 and a second portion 98. In one embodiment, first portion 96 extends from primary panel 80 a smaller distance than second portion 98 extends from primary panel 80. First portion 96 extends around the perimeter of second portion 98. In this respect, inside edge 94 is formed as a stepped edge with higher, second portion 98 being positioned just inside lower, first portion 96. In one embodiment, the corners of inside edge 94 formed at the intersections of side walls 82, 84, 86, and 88 with another of side walls 82, 84, 86, and 88 are rounded or chamfered.

Cover 26 includes a plurality of protrusions 100 extending from inside surface 92 parallel to side walls 82, 84, 86, and 88. One protrusion 100 is positioned near each of the corners of edges 94 (i.e. near the intersections of side walls 82, 84, 86, and 88 with another side wall 82, 84, 86, and 88). In one embodiment, each protrusion 100 extends further from inside surface 92 than each side wall 82, 84, 86, and 88 extend beyond inside surface 92. Each protrusion 100 is positioned on cover 26 to generally align with one of apertures 50 of base 24 upon assembly. A threaded cavity 102 is formed within each protrusion 100. In one embodiment, each threaded cavity 102 is configured to receive a screw or other connection device for coupling base 24 with cover 26.

In one example, inside surface 92 defines an audio circuit indentation 104 sized similar to or slightly greater than the overall size of audio circuit 14 generally representing where audio circuit 14 will be positioned with respect to cover 26. Audio circuit indentation 104 of cover 26 is similar to audio circuit indentation 74 of base 24. Accordingly, indentation 74 forms an area of primary panel 80 having a slightly lesser thickness than other areas of primary panel 80.

A button aperture 106 extends through primary panel 80 within audio circuit indentation 104. Button aperture 106 is sized and shaped to receive button 18. In one embodiment, a raised rim 108 extends upward from inside surface 92 generally around the perimeter of button aperture 106. In one example, button aperture 106 and raised rim 108 are positioned to correspond with the positioning of audio circuit 14 as will be further described below.

A speaker reception area 110 is spaced from audio circuit indentation 104 and is configured to receive speaker 16 during assembly. Speaker reception area 110 includes an indentation 112 sized similar to or slightly larger than speaker 16. In one example, a plurality of apertures 114 are defined through primary panel 80 within indentation 112. The plurality of apertures 114 are configured to facilitate transfer of sound from speaker 16 out of stored-value card 10 during use. A raised rim or ring 116 extends generally about indentation 112 to further restrain movement of speaker 16 once coupled with cover 26.

In view of the above, outside surface 90 partially defines button aperture 106 and the plurality of speaker apertures 114. In addition, in one embodiment, a panel indentation 118 is defined on outside surface 90 and is sized and configured to receive face panel 20. In one embodiment, outside surface 90 is printed with or otherwise includes indicia relating to at least one of a brand, store identifier, holiday, occasion, media format identifier, sport, etc.

In one embodiment, each of base 24 and cover 26 is formed by injection molding of a plastic such as PVC or any other suitable material to define the various attributes of base 24 and cover 26. Other methods of forming base 24 and cover 26 are also contemplated. In one embodiment, in which base 24 is formed by injection molding, account identifier 70, redemption indicia 72, and any other indicia or information are printed onto the injection molded base 24.

In one example, base 24 and cover 26 are each formed of materials having a similar or identical color. In other examples, base 24 and cover 26 may be formed of materials having different coloring. For instance, in one embodiment, base 24 is colored white to best display the printed account identifier 70, redemption indicia 72, etc. on its outer surface 40 while cover 26 is a different color to correspond with and/or compliment the coloring of face panel 20.

Face panel 20 is generally planar and is formed of paper, plastic, or other suitable material. In one embodiment, face panel 20 is sized to fit within panel indentation 118 of cover 26. With this in mind, face panel 20 includes a first, outer surface 120 and a second, inner surface 122. First surface 120 includes indicia such as decorative indicia 124, brand indicia 126, and a button indicator 128. In one embodiment, decorative indicia 124 relate to a particular occasion, such as a wedding, new baby, graduation, holiday, season, brand identifier, media format identifier, or other visual design to promote purchase of stored-value card 10.

In one particular embodiment, decorative indicia 124 include a picture or a graphic representing a newborn baby as well as words of congratulation, such as "Welcome, wee one!" In other embodiments, decorative indicia 124 may encompass a majority of face panel 20 and include all or a portion of a character relating to and readily identifiable as being associated with a particular media format. Decorative indicia 124 are one example of means for associating stored-value card 10 with at least one of a product brand, a store, a holiday, a season, an occasion, and a media format identifier. Brand indicia 126 identify a brand associated with stored-value card 10, such as identifying a product brand, a store brand, etc.

Button indicator 128 is positioned on face panel 20 to generally align with button 18 upon assembly. In this respect, button indicator 128 corresponds with a location of stored-value card 10 where the bearer, e.g. customer or recipient, can push stored-value card 10 to hear the stored audio file, as will be further described below. Button indicator 128 is one example of means for informing a user of how to initiate playing of the sound file stored to stored-value card 10, as will be further described below. Other combinations or selections of indicia to be displayed on face panel 20 are also contemplated. In an alternate embodiment, indicia described to be included on face panel 20 are directly printed to cover 26. In one embodiment, first, outside surface 120 of face panel 20 is printed and finished in any one of a variety of manners such as dull, matte, gloss, textured, or other effect finish. In one embodiment, the finish chosen for first, outside surface 120 further complements the indicia included on first, outside surface 120.

In addition, in one embodiment, face panel 20 includes a plurality of apertures 130 extending throughout face panel 20 and configured to generally align with at least a portion of speaker apertures 114 of cover 26. In this respect, sound coming from speaker 16 has a clear pathway through at least a portion of apertures 114 of cover 26 and apertures 130 of face panel 20. Other combinations or selections of information or indicia to be displayed on face panel 20 are also contemplated.

Second, inside surface 122 is configured to interface with cover 26 within indentation 118. In one embodiment, face panel 20 is adhered to cover 26 with any suitable adhesive. In other embodiments, face panel 20 is formed on an adhesive backed plastic, paper, cardstock, etc. and is directly applied and adhered to cover 26.

Figure 4:
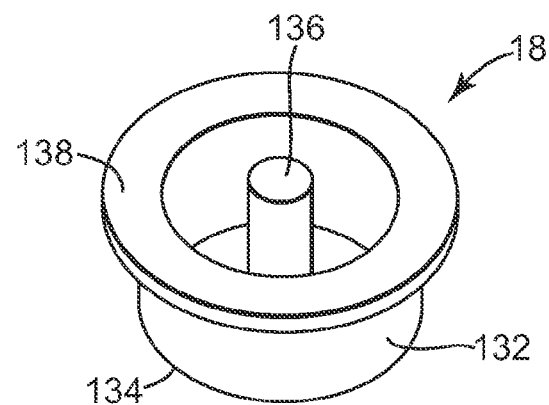
FIG. 4 is a bottom, perspective view of one embodiment of a button of a stored-value card, according to the present invention.

FIG. 4 illustrates a perspective view of one embodiment of button 18 of stored-value card 10. Button 18 generally includes a relatively short hollow cylinder 132, an end wall 134, and a pin 136. End wall 134 extends across one end of hollow cylinder 132. Pin 136 extends from end wall 134 through the center of cylinder 132. In one embodiment, pin 136 extends from end wall 134 a distance further than cylinder 132 extends from end wall 134. Pin 136 is relatively rigid. A ring or rim 138 extends about the perimeter of cylinder 132 on an end opposite end wall 134. More particularly, rim 138 extends radially outwardly from cylinder 132 and, therefore, has a larger diameter than cylinder 132. Cylinder 132 is sized with a diameter sufficient to fit within button aperture 106. Conversely, rim 138 has a diameter greater than the overall diameter of button aperture 106 and raised rim 108 of cover 26.

Figure 5:
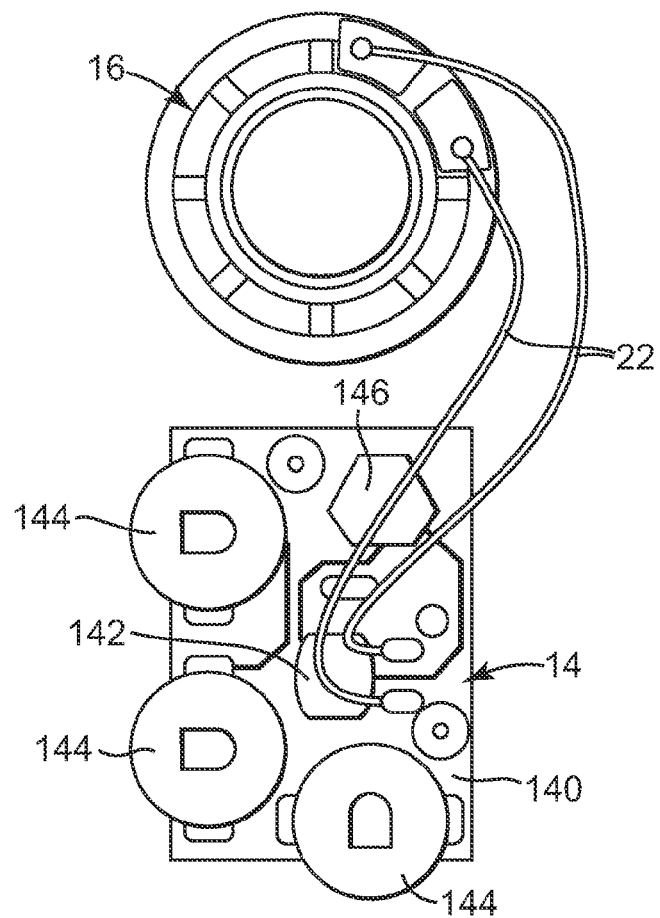
FIG. 5 is a top view of one embodiment of an audio circuit and a speaker of a stored-value card, according to the present invention.

FIG. 5 illustrates one embodiment of audio circuit 14 and speaker 16. Audio circuit 14 includes a printed circuit board (PCB) 140, a voice integrated circuit or chip 142, at least one battery 144, and a switch 146 as illustrated in FIG. 5 and in the block diagram of FIG. 5A. Voice integrated circuit 142, the at least one battery 144, and switch 146 are each mounted to PCB 140 and are each electrically coupled to the other components 142, 144, and/or 146 of audio circuit 14. In one embodiment, PCB 140 includes electrical traces, one or more resistors, one or more capacitors, and/or any suitable number of other electrical components facilitating the proper function of audio circuit 14 and/or electrical connection of electrical components mounted on PCB 140.

In one embodiment, voice integrated circuit 142 includes a memory 150, e.g. read only memory (ROM) or other suitable memory. Voice integrated circuit 142 is programmed during manufacturing to store a digitized sound recording or audio file 152 to memory 150. In one embodiment, audio file 152 relates to and/or is readily identifiable as being associated with at least a portion of decorative indicia 124 of face panel 20. Accordingly, audio file 152 is one example of means for associating stored-value card 10 with at least one of a product brand, a store, a holiday, a season, an occasion, and a media format identifier. During use, voice integrated circuit 142 is configured to generate or produce audio file 152, which was programmed to voice integrated circuit 142 during manufacturing.

In one embodiment, voice integrated circuit 142 additionally includes a recording element 156 configured to record personalized messages for subsequent replay to the recipient of stored-value card 10. Recording element 156 includes or is coupled to a microphone or other suitable recording device for receiving an audio message. Upon depression of switch 146 or a second switch similar to switch 146, recording element 156 is activated to capture a personalized audio message spoken or played generally toward stored-value card 10. The personalized audio message is stored to memory 150 as audio file 152 and is played back to the bearer upon depression of switch 146. For instance, the personalized audio message may wish a particular recipient congratulations, happy birthday, good wishes, etc. in a personalized manner not generally available from audio files 152 recorded during manufacturing of stored-value card 10 as described above.

Battery 144 provides electrical power to PCB 140 and voice integrated circuit 142. In one embodiment, battery 144 is an alkaline battery such as a standard AG10 1.5 volt battery or any other suitable battery. In one embodiment, switch 146 is a snap or pressure sensitive switch mounted to PCB 140. Depression of switch 146 serves to close audio circuit 14 and to activate voice integrated circuit 142. Audio circuit 14 is one example of means for storing a sound file associated with stored-value card 10.

Speaker 16 is any suitable speaker capable of converting audio file 152 received from audio circuit 14 into sound waves perceivable by the bearer of stored-value card 10, e.g. the customer and/or recipient. In one example, speaker 16 is a 27mm speaker or any other suitably sized speaker 16. Audio circuit 14 and speaker 16 are one example of means for generating sound within stored-value card 10.

Figure 6:
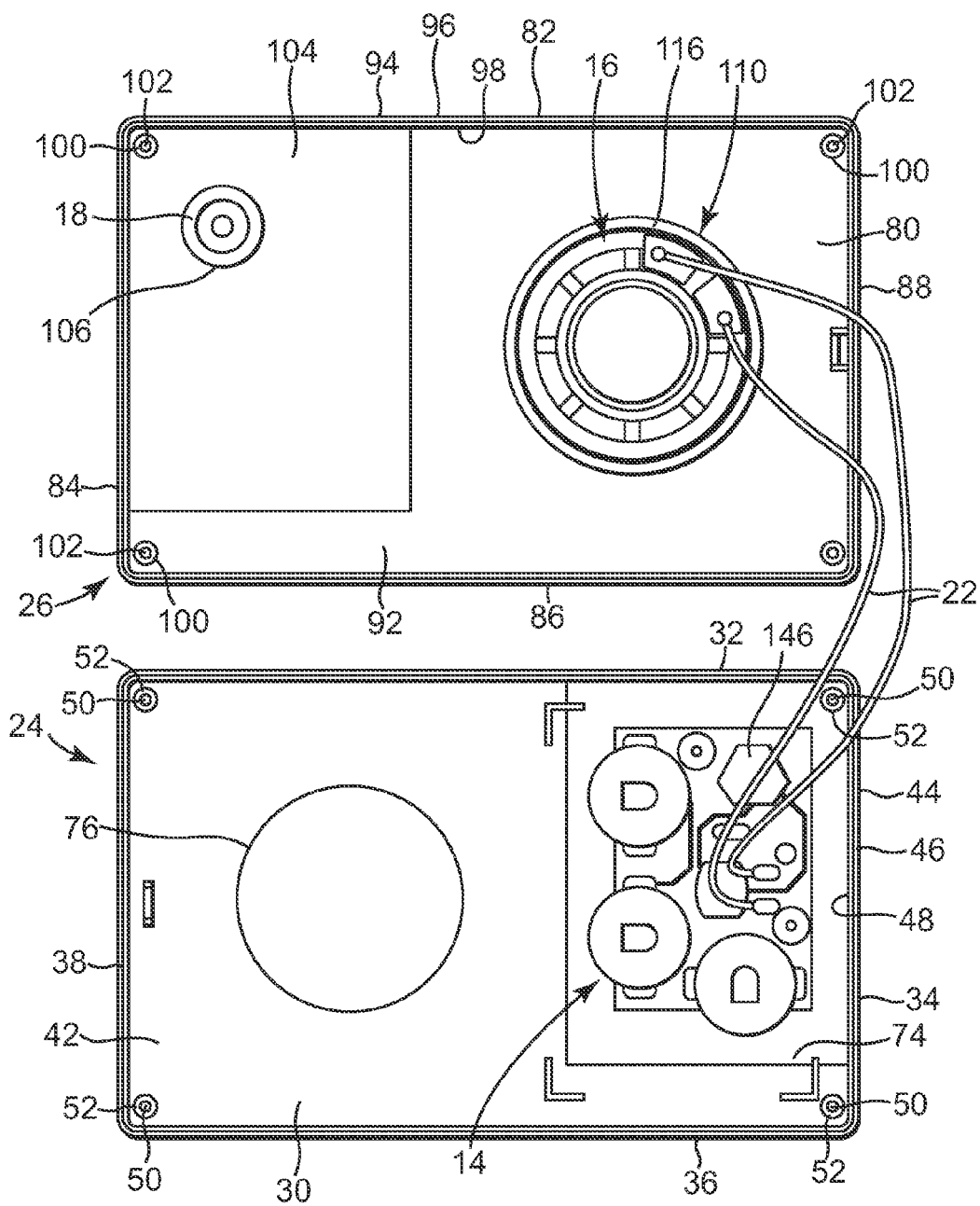
FIG. 6 is a top view of one embodiment of a partially assembled stored-value card, according to the present invention.

As illustrated in the embodiment of FIG. 6, during assembly, audio circuit 14 is coupled to base 24. In particular, PCB 140 of audio circuit 14 is adhered to base 24 within audio circuit indentation 74. More specifically, audio circuit 14 is placed within indentation 74 of base 24 such that switch 146 will generally align with button aperture 106 of cover 26 upon assembly.

Speaker 16 is positioned within speaker reception area 110 of cover 26. In particular, speaker 16 is placed face down in indentation 112 of speaker reception area 110 to be retained within rim 116. An adhesive is applied about at least a portion of rim 116 to adhere speaker 16 to rim 116. Accordingly, audio circuit 14 and speaker 16 are adhered in place within housing 12. More specifically, speaker 16 is coupled to cover 26 to align with speaker indentation 76 of base 24 upon assembly of stored-value card 10. In other embodiments, audio circuit 14 is adhered to cover 26 rather than base 24 and/or speaker 16 is adhered to base 24 rather than cover 26.

Button 18 is placed within button aperture 106 such that cylinder 132 of button 18 fits within rim 108 of button aperture 106 and rim 138 of button 18 interfaces with and extends over rim 108 of button aperture 106, thereby coupling button 18 to cover 26. In this respect, rim 138 of button 18 prevents button 18 from falling through button aperture 106 towards the outside of cover 26.

Once audio circuit 14, speaker 16, and button 18 are in place, cover 26 is placed upon base 24, or vice versa. Accordingly, base 24 is placed on cover 26 such that inside edge 44 of base 24 interfaces with inside edge 94 of cover 26. More specifically, first portion 46 and second portion 48 of inside edge 44 interface with first portion 96 and second portion 98 of inside edge 94, respectively. The stepped interface provides for a stable and generally neat coupling of base 24 and cover 26.

Once base 24 and cover 26 are mated, each aperture 50 in base 24 generally aligns with one of the plurality of threaded cavities 102 in cover 26, and button 18 generally aligns with switch 146 of audio circuit 14. More specifically, pin 136 of button 18 is generally centered on switch 146. In addition, when base 24 and cover 26 are mated, speaker 16 generally aligns with speaker indention 76 of base 24, and audio circuit 14 generally aligns with audio circuit indentation 104. Attachment mechanisms, such as screws 168, are threaded through apertures 50 and into threaded cavities 102. In this respect, base 24 is secured to cover 26. Other methods of securing base 24 to cover 26 are also contemplated.

Following securing of base 24 to cover 26, face panel 20 is applied to outside surface 90 of cover 26. In particular, face panel 20 is fit and adhered within panel indentation 118 to generally align apertures 130 with speaker apertures 114 of cover 26. When aligned and placed on cover 26, button indicator 128 generally aligns with button 18. In one embodiment, face panel 20 is also adhered to end wall 134 of button 18. In other embodiments, face panel 20 is applied to cover 26 before assembling cover 26 with button 18, speaker 16, or base 24.

Upon assembly, stored-value card 10 functions to both amuse consumers and/or recipients and to entice consumers to purchase stored-value card 10. In particular, upon a consumer or recipient pressing face panel 20 in a position corresponding with button indicator 128, button 18 is depressed thereby also depressing switch 146 of audio circuit 14. Depression of switch 146 causes the audio file stored in audio circuit 14 to be played via speaker 16. In particular, additionally referring to FIGS. 5 and 5A, depression of switch 146 closes audio circuit 14, thereby drawing current from the at least one battery 144 to voice integrated circuit 142. The output signal relating to audio file 152 of activated voice integrated circuit 142 is sent to speaker 16, thereby driving speaker 16 to produce sound waves corresponding with audio file 152 of voice integrated circuit 142. The sound waves travel through stored-value card 10, in particular, apertures 114 and 130, to reach the customer, recipient, or other bearer of stored-value card 10.

When audio file 152 is finished playing, voice integrated circuit 142 automatically deactivates or shuts off. In one embodiment, the current drawn by voice integrated circuit 142 during its inactive state is sufficiently low to allow the at least one battery 144 to provide power to audio circuit 14 for a number of months or years. User interaction with button 18 and thereby audio circuit 14 illustrates one example of means for playing the sound file upon user demand. Accordingly, the customer and/or recipient are presented with both a stored-value card and a source of additional amusement.

In particular, in one embodiment, the source of additional amusement is a collective audio and visual presentation provided by viewing decorative indicia 124 and hearing audio file 152. For instance, in the illustrated embodiment, the decorative indicia 124 includes a character, for example, a baby, and the audio file 152 includes an audible expression readily associated with the character, for example a baby giggle. As such, the character and the audible expression provide an audio and visual presentation that amuses the bearer of stored-value card 10. Use of other characters, e.g. characters from movies, books, television, video games, characters representing other life events, clip art, etc., and other audible expressions, e.g. quotes, laughs, songs, etc., are also contemplated. In one embodiment, the collective audio and visual presentation of stored-value card 10 in a retail setting entices a potential consumer to purchase and/or load stored-value card 10.

Figure 7A:
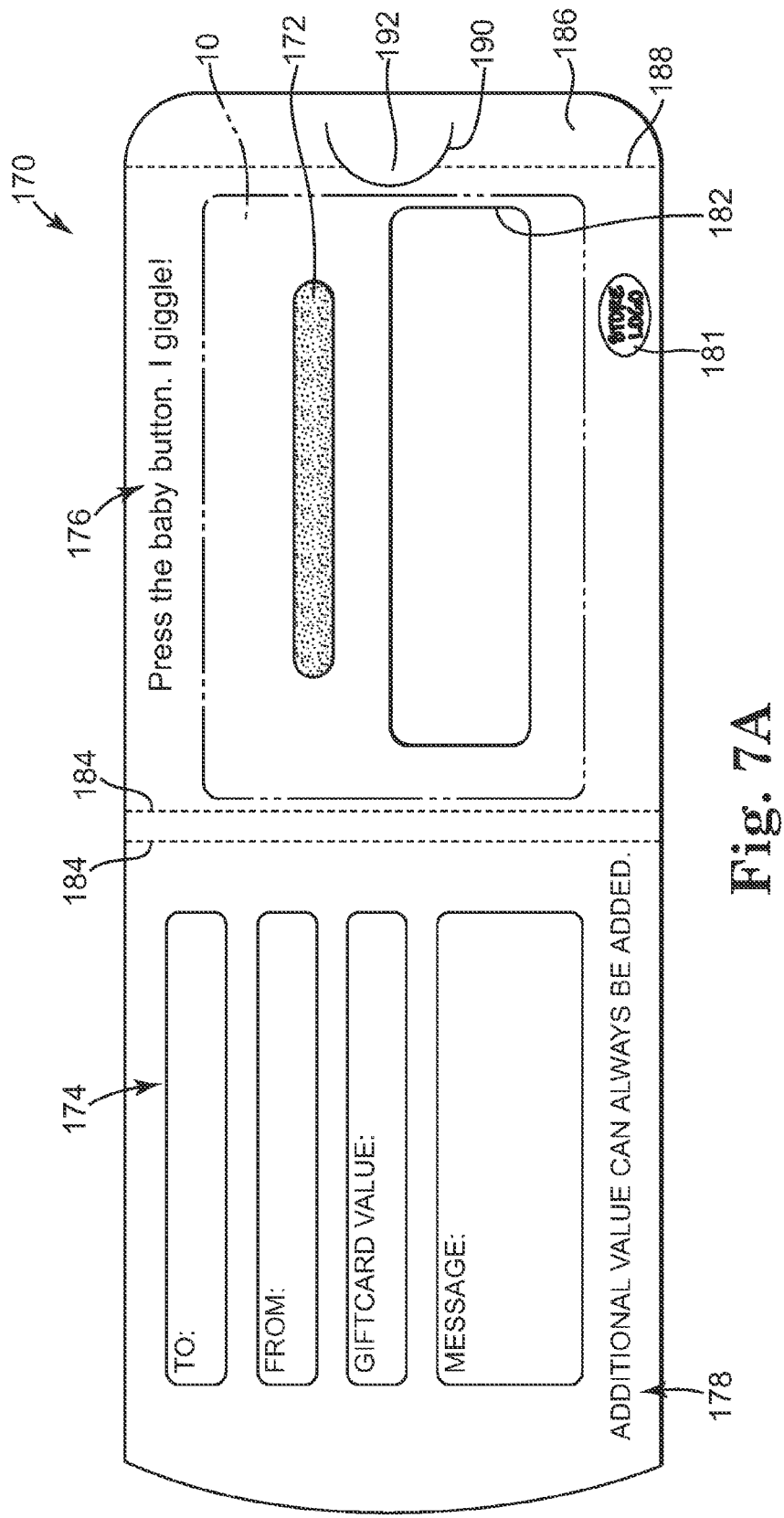
FIG. 7A is a front view of one embodiment of an unfolded carrier for a stored-value card, according to the present invention.

FIGS. 7A and 7B illustrate a carrier or backer 170 for supporting stored-value card 10. Stored-value card 10 is readily releasably attached to backer 170, for example by an adhesive 172 or the like, and is represented in phantom lines in FIG. 7A. Backer 170 comprises a single layer or multiple layers of paper or plastic material, for example, generally in the form of a relatively stiff but bendable/flexible card. Other materials are also contemplated. Backer 170 displays indicia, graphics or text information including store logo(s), store name(s), slogans, advertising, instructions, directions, brand indicia, promotional information, media format identifiers (e.g. characters, logos, scenes, or other illustrations relating to at least one of a movie, television show, book, etc.), characters, and/or other information.

Indicia 174, for example, include to, from, initial gift card value, and message fields. Indicia 176 promote that stored-value card 10 includes a playable sound or audible file. In particular, in one example, indicia 176 encourage a user to press stored-value card 10 to cause the audio file to be played. For example, in one embodiment, indicia 176 state "Press the baby button. I giggle!" Indicia 176 are one example of means for informing a user of how to initiate playing of the sound file stored to stored-value card 10. Indicia 178 notify a user and promote that additional value can always be added to stored-value card 10.

Indicia 180 indicate that stored-value card 10 is redeemable for the purchase of goods and/or services and that, upon use, a value of the purchased goods and/or services will be deducted from the financial account or record linked to stored-value card 10. In one embodiment, indicia 180 include phrases such as "<NAME OF STORE> GiftCard" and "This GiftCard is redeemable for merchandise or services at any of our stores or at our website," and/or provides help or phone line information in case of a lost, stolen, or damaged stored-value card 10, etc. Indicia 181 identify a store, brand, department, etc. and/or services associated with stored-value card 10. Any of indicia 174, 176, 178, 180, 181, or other indicia, optionally may appear anywhere on backer 170 or stored-value card 10. Additional information besides that specifically described and illustrated herein also may be included.

Backer 170 defines a window or opening 182 for displaying account identifier 70 of stored-value card 10 as illustrated in FIG. 7B. As previously described, account identifier 70 is adapted for accessing a financial account or record associated with stored-value card 10 for activating, loading, or debiting from the account or record. Accordingly, window 182 allows access to account identifier 70 to activate and/or load stored-value card 10 without removing stored-value card 10 from backer 170.

In one embodiment, backer 170 is a bi-fold substrate defining fold line(s) 184, about which backer 170 is foldable roughly in half. In FIGS. 7A and 7B, backer 170 is unfolded, i.e. is in an open configuration. According to one embodiment, FIG. 7A illustrates surfaces of backer 170 that will be supported on a rack or other fixture to face a customer of a retail store who is considering the purchase of stored-value card 10. In another example, while on display in a retail store, backer 170 is folded back about at least one of fold lines 184 to present only the surfaces of backer 170 illustrated in FIG. 7A and positioned on the same side of fold lines 184 as stored-value card 10 to a consumer. In such an embodiment, indicia 174 and 178 would not be visible to a consumer when backer 170 and stored-value card 10 are placed for display in the retail store.

Figure 8:
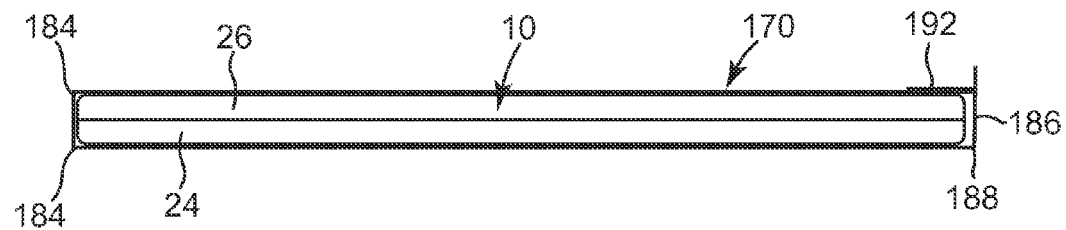
FIG. 8 is a side view of one embodiment of a packaged stored-value card, according to the present invention.

After purchase, backer 170 is foldable about fold lines 184 such that the FIG. 7A surfaces of backer 170 are folded towards each other and stored-value card 10 is enclosed in a compact package formed by folded backer 170 as illustrated with additional reference to the side view of FIG. 8. In this manner, the surfaces of backer 170 illustrated in FIG. 7B are disposed toward the outside of the folded, compact package, according to embodiments of the invention. In one embodiment, backer 170 folded as illustrated in FIG. 8 effectively wraps stored-value card 10 for presentation from a consumer to a recipient. In one embodiment, fold lines 184 are two fold lines slightly spaced from one another to accommodate a thickness of stored-value card 10. Folding in the other direction about fold lines 184 for display on a rack in a retail setting, or about other fold line(s) of backer 170, is also contemplated.

In one embodiment, backer 170 additionally includes a tab 186 extending from one edge of backer 170 running parallel to fold lines 184. An additional fold line 188 runs between tab 186 and the remainder of backer 170. In addition, a generally semi-circular cut 190 is formed from tab 186 through fold line 188 and partially onto the remainder of backer 170. In one embodiment, cut 190 is generally centered upon tab 186 and backer 170. Accordingly, semi-circular cut 190 defines a generally semi-circular flap 192 which can be partially bent away from the remainder of tab 186 and backer 170.

More specifically, upon folding of backer 170 about fold lines 184, tab 186 is folded upward about fold line 188 and flap 192 is pulled away from tab 186 to interface with an opposing edge of backer 170. In this respect, the opposing edge of backer 170 can be tucked beneath flap 192 to maintain backer 170 in a folded position as illustrated in FIG. 8. Backers similar to backer 170 can be used with various sizes and shapes of stored-value card 10. Other backers or packages are also contemplated for supporting stored-value card 10. Backer 170 is one example of means for removably supporting stored-value card 10 for display in a retail setting.

Figure 9:
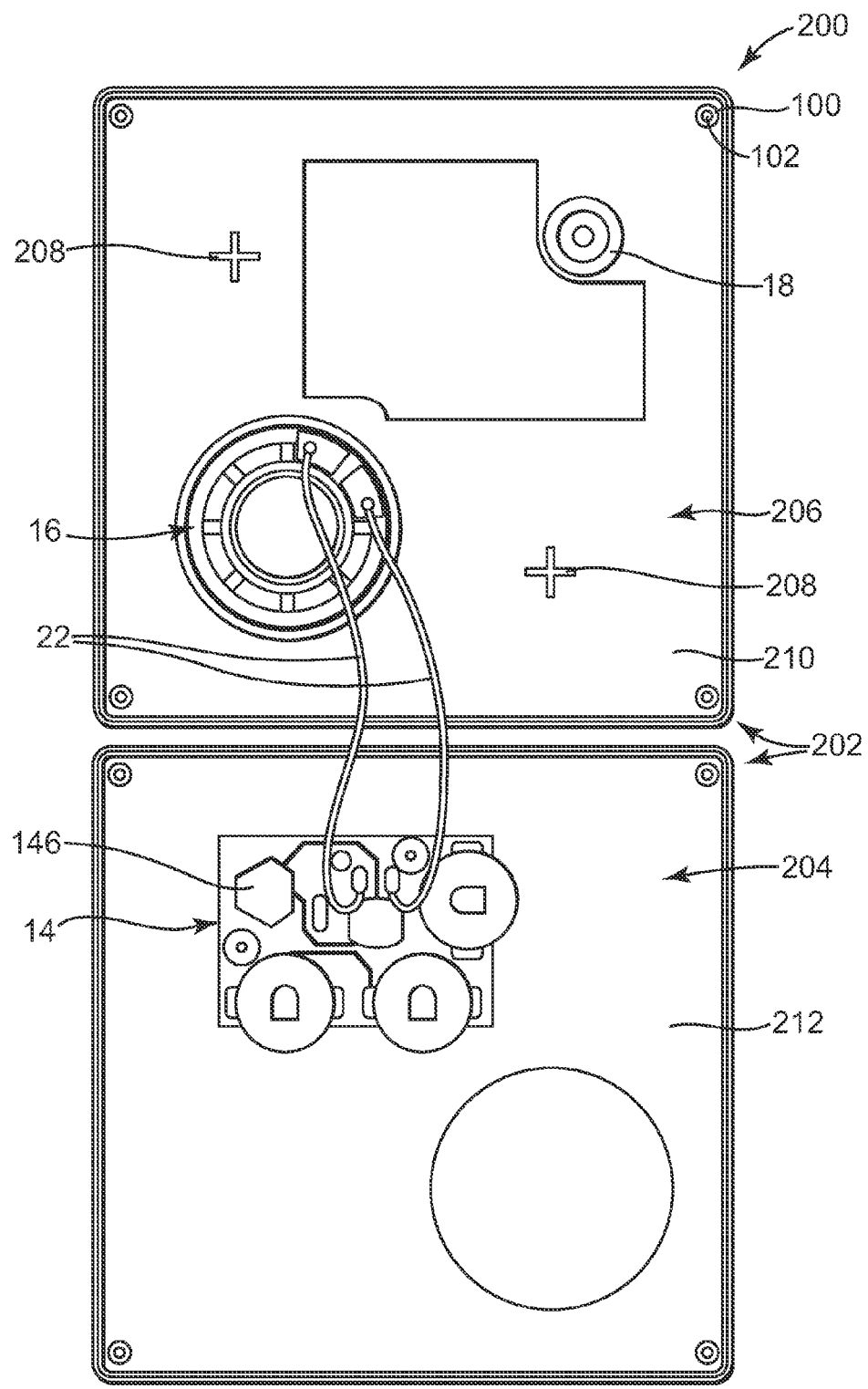
FIG. 9 is a top view of one embodiment of a partially assembled stored-value card, according to the present invention.

FIG. 9 illustrates another embodiment of a stored-value card generally at 200. Stored-value card 200 is similar to stored-value card 10 except for those characteristics specifically enumerated herein. In particular, stored-value card 200 is shaped as a square rather than as an elongated rectangle. Accordingly, additional space surrounding audio circuit 14 and speaker 16 is left void within a housing 202 of stored-value card 200. Housing 202 defines a base 204 and a cover similar to base 24 and cover 26, respectively, of stored-value card 10.

In one embodiment, cover 206 includes spacers or protrusions 208 extending from an inside surface 210 of cover 206 generally parallel to the cover sidewalls. Upon assembly, spacers 208 are configured to interact with an inside surface 212 of base 204. Accordingly, spacers 208 generally prevent or decrease a collapse or cave-in of stored-value card 200 in areas wherein primary panels 30 and 80 of base 204 and cover 206 are not fully supported relative to each other by components such as audio circuit 14, speaker 16, or by base and cover side walls. Other suitable protrusions or spacers are also contemplated to generally prevent or decrease the collapse or cave-in of stored-value card 10 or 200 at or near the protrusion or spacer.

Stored-value cards come in many forms, according to embodiments of the invention. The gift card, like other stored-value cards, can be "re-charged" or "reloaded" at the direction of the original consumer, the gift recipient, or third party. The term "loading on" or "loaded on" herein should be interpreted to include adding to the balance of a financial account or record associated with a stored-value card. The balance associated with a stored-value card declines as the card is used, encouraging repeat visits. The card remains in the user's purse or wallet, serving as an advertisement or reminder to re-visit the associated merchant. Gift cards, according to embodiments of the invention, provide a number of advantages to both the consumer and the merchant. Other gift cards and stored-value cards according to embodiments of the invention include loyalty cards, merchandise return cards, electronic gift certificates, employee cards, frequency cards, pre-paid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. For example, stored-value card 10 or 200 optionally is a physical card made of plastic, paper, generally stiff paper, other substrate, or the like. Adding value to stored-value card 10 or 200 optionally includes adding either a fixed amount or an amount that can be chosen by the customer or other user. Other modifications within the scope of the invention in its various embodiments will be apparent to those of ordinary skill.

What is claimed is:

1. A stored-value card assembly comprising:
   an audio circuit including a memory storing an audio file;
   a speaker coupled to the audio circuit;
   an activation area aligned with a switch of the audio circuit, such that interaction with the activation area moves the switch to initiate the audio circuit to play the audio file via the speaker;
   a stored value-card including an account identifier linking the stored-value card assembly to a financial account or record;
   a backer coupled to and supporting the stored-value card;
   a storage chamber maintaining the audio circuit and the speaker, the storage chamber including open areas around the audio circuit and the speakers, and
   protruding features extending across the open areas for supporting the storage chamber to substantially prevent collapse of the storage chamber at points spaced from the audio circuit and the speaker.

2. The stored-value card assembly of claim 1, wherein the backer supports the audio circuit, the speaker, and the activation area.

3. The stored-value card assembly of claim 2, wherein the stored-value card supports each of the audio circuit and the speaker, and the backer only supports the audio circuit and the speaker via the stored-value card.

4. The stored-value card assembly of claim 1, wherein the backer wraps around the audio circuit and the speaker to substantially enclose the audio circuit and the speaker.

5. The stored-value card assembly of claim 4, wherein the stored-value card is secured to a substantially planar surface of the backer.

6. The stored-value card assembly of claim 5, wherein the stored-value card and the backer are formed separately from one another and then secured to one another.

7. The stored-value card assembly of claim 6, wherein the stored-value card is adhered to the substantially planar surface of the backer.

8. The stored-value card assembly of claim 5, wherein the account identifier is positioned on a first surface of the stored-value card, and the first surface of the stored-value card faces and is positioned adjacent the substantially planar surface of the backer.

9. The stored-value card assembly of claim 8, wherein the stored-value card is adhered to the substantially planer surface of the backer.

10. The stored-value card of claim 8, wherein the decorative indicia are included on the substantially planar surface of the backer.

11. The stored-value card of claim 8, wherein account identifier is statically attached to the stored-value card.

12. The stored-value card of claim 11, wherein the backer defines an aperture sized larger than the account identifier, and the aperture of the backer is aligned with the account identifier such that the account identifier is viewable through the aperture of the backer.

13. The stored-value card assembly of claim 4, wherein the backer is formed of one of cardboard and paperboard and is folded around the audio circuit and the speaker.

14. The stored-value card assembly of claim 13, wherein the backer is formed as a single piece.

15. The stored-value card assembly of claim 1, wherein the stored-value card assembly includes a substantially planar surface extending over the switch and defining the activation area as part of the substantially planar surface, the substantially planar surface defines two opposing outermost side edges and is continuous between the two opposing outermost side edges, and the substantially planar surface is more than twice the size of the activation area.

16. The stored-value card assembly of claim 1, wherein the backer is foldable to selectively cover and uncover the account identifier.

17. The stored-value card assembly of claim 1, further comprising a button formed separately from the audio circuit, the stored-value card and the backer, the button positioned adjacent the switch such that when a bearer of the stored-value card assembly interacts with the button, the button interfaces with the switch of the audio circuit to selectively initiate playing of the audio file via the speaker.

18. The stored-value card assembly of claim 1, wherein the backer is formed of one of paperboard and cardboard, and the stored-value card is formed of plastic.

19. The stored-value card assembly of claim 1, wherein the audio circuit includes a recording element configured to record the audio file stored by the memory.

20. A stored-value card assembly comprising:
   an audio circuit including a memory and a recording element, wherein the recording element is configured to record an audio file to the memory;

a speaker coupled to the audio circuit;
an activation area aligned with a switch of the audio circuit, such that interaction with the activation area moves the switch to initiate the audio circuit to play the audio file via the speaker;
a stored value-card including an account identifier linking the stored-value card assembly to a financial account or record;
a backer coupled to and supporting the stored-value card the backer including decorative indicia corresponding with the audio file;
a storage chamber maintaining the audio circuit and the speaker, the storage chamber including open areas around the audio circuit and the speakers, and
protruding features extending across the open areas for supporting the storage chamber to substantially prevent collapse of the storage chamber at points spaced from the audio circuit and the speaker.

21. The stored-value card assembly of claim 20, wherein the protruding features are integrally formed with a structure of the stored-value card assembly that defines perimeter boundaries of the storage chamber.

22. The stored-value card assembly of claim 21, wherein the stored-value card defines the storage chamber and includes the structure and the protruding features.

* * * * *